3,341,298
METHOD FOR THE DETECTION OF FREE WATER IN HYDROCARBON FUELS

Robert P. Pietrangelo, Apt. 25A, Erringer Place, Manheim and Morris, Philadelphia, Pa. 19144
No Drawing. Filed Feb. 18, 1964, Ser. No. 345,809
4 Claims. (Cl. 23—230)

ABSTRACT OF THE DISCLOSURE

The subject application relates to an improved method of determining the presence and/or the amount of free water in hydrocarbon fuels. In accordance with the method, the fuel to be tested is intermixed with sodium tetrabromo fluorescein and treated with ammonia. The intensity of the pink color of the ammoniated sodium tetrabromo fluorescein is then compared with standard fuel samples containing predetermined amounts of free water.

---

The invention described herein may be manufactured and used by or for the Government of the United States of America for governmental purposes without the payment of any royalties thereon or therefor.

This invention relates to a method for determining the presence of free water in liquids of low water solubilities. More specifically, the invention provides a method for making a visual quantitative determination of traces of undissolved water present in aircraft fuels.

All hydrocarbons have the capability of dissolving small amounts of water. This dissolved water is completely combined with the fuel and will not separate during ordinary handling of the fuel. The maximum amount of water, which can be dissolved in a fuel at a particular temperature, is termed the "saturation value" which changes both with the temperature and the molecular structure of the hydrocarbon. As soon as the amount of water in a fuel exceeds the fuel's saturation value, the water becomes free water which freezes, thereby blocking the openings in the fine screens and filters as well as other small and critical openings located in the many other parts of the aircraft fuel system.

There has been a continuous effort over the years to develop a suitable test procedure and apparatus for readily detecting with precision the presence of undesirable amounts of water in fuels, but these efforts have been largely unsuccessful and the results unreliable. A variety of techniques have been described in the patent literature for measuring water content in various fluids, but all have been found unsatisfactory for measuring with a desired accuracy of about 2.5 parts per million the presence of water in a distillate fuel. Most of these prior techniques rely upon a change in the pH of the fuel to indicate the presence of water therein.

In a previous application, which issued as Patent 3,066,221, filed July 13, 1961, by Per Trygve Thyrum, one of my co-workers, there is disclosed and claimed a method of measuring free water contained in liquids of low water solubility. This method employed a saturated solution of potassium fluorescein which was incorporated onto one side of a filtering element so as to form a thin uniform film thereon. Any free water present in the fuel will cause a yellow-green stain on the treated side of the filtering element which was visible under ultraviolet light. This method was found to be unsuitable for field tests because of the requirement for an ultraviolet light source to interpret the results.

It is an object of this invention to provide a method for determining the amount of "free water" in a hydrocarbon fuel sample without the necessity of employing ultraviolet light.

Another object of this invention is to provide a sensitive, simple, practical and inexpensive method for the quick, reliable, and rapid determination of the presence of even minute traces of free water in hydrocarbon fuels which may be employed in either the field or laboratory, even by non-technically educated personnel.

Yet another object of this invention is to provide a sensitive reliable and convenient method for use in determining the presence of even minute traces of water in a hydrocarbon fuel as it flows through a fuel line, thereby monitoring the entire flow of the line without having to make any corrections for temperature and atmospheric conditions.

Other objects and many of the attendant advantages of this invention will be readily appreciated as the same becomes better understood by reference to the following detailed description.

According to my invention, a saturated solution of sodium fluorescein is placed on one side of a filtering element so as to form a thin uniform film thereon. Sodium fluorescein is known commercially as uranine dye.

The uranine is then sprayed onto one side of a filtering element, which consists of a white cellulosic material, such as white unsized paper, paper pulp, woven cotton cloth and the like, to a uniform depth of approximately 0.007 inch. After drying in air and after ammonia is passed through the pad, the filtering element is then ready for use to test the free water content of a liquid such as a jet fuel. To prevent contamination by exceedingly moist air, it is stored in a desiccator.

In testing for free water, the filtering element is suitably mounted in a holder having a suction connected thereto. The test samples of hydrocarbon fuels are drawn through the filtering element. It is important from the standpoint of accuracy to maintain the flow rate of the hydrocarbon fuel between 35 cc./minute and 2200 cc./minute. This flow rate should be constant.

In the preferred embodiment of my invention, a 500 cc. sample of jet JP-4 or -5 fuel was placed inside of a polyethylene bottle. The bottle was connected to the suction apparatus in the holder for the filtering element. The fuel was drawn through the filtering element at the rate of approximately 150 cc./minute. After the sample had passed through the element, the suction was increased to clear the element of any fuel remaining therein.

The element was then brominated from a solution of $K_2Cr_2O_7$, $H_2SO_4$ and $KBr$. This solution releases $Br_2$ which enters into an addition reaction with the uranine to form sodium tetrabromo fluorescein in accordance with the following equation:

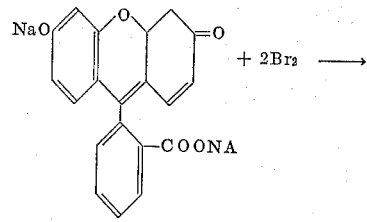

$+ 2Br_2 \longrightarrow$

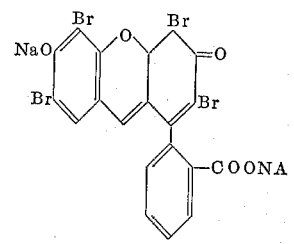

Sodium tetrabromo fluorescein is a bright yellow dye known commercially as eosin. When the sodium tetrabromo fluorescein is subjected to ammonia fumes, it will change to a dark pink color.

I have discovered that the presence of water in the sodium fluorescein will limit the effect of the above described addition reaction because the bromine coming into contact with the water will form HBrO and HBr.

This phenomenon can be employed to determine the amount of water in the fuel sample. The concentration of water in the fluorescein controls the intensity of the pink color which appears when the filtering element is subjected to $NH_3$ fumes. The more water present, the lighter the pink coloration.

A set of standards can be prepared by subjecting a series of filtering elements to a known amount of a specific fuel at a specific temperature containing a known amount of free water. The total water would have to exceed the saturation value for the fuel at that temperature. After being subjected to the method described hereinabove, these filtering elements will vary in the intensity of the pink coloration. The concentration of the "free water" in parts per million is indicated by the intensity of the pink coloration in the filter element. The sample containing the unknown quantity of free water can then be calculated by comparing its intensity of pink coloration with that of the standards. It will be noted that in the use of this method, it is possible to obtain an approximation of the amount of free water in a measured sample under examination. When a measured quantity of the fuel under examination is brought into contact with the filtering elements which have been standardized, the deepness of the color will indicate the amount of free water present in the system.

This method provides a visual means for the detection of trace amounts of free or dispersed water in jet fuels. It is to be utilized as a qualitative field test to detect the presence of free or dispersed water in jet fuels at concentrations as low as 1 part per million. The method is rapid, inexpensive and simple enough to be operated by untrained personnel. It is not sensitive to dissolved water and will work in any type of jet fuel or kerosene regardless of the crude source and is not affected by the presence of any of the crude jet fuel additions found therein. It is thus apparent that this method for indicating the presence of free water in hydrocarbon fuels by visual means has many advantages over other methods known in the prior art.

It would be understood that various changes in the details, materials and arrangement of steps which have been herein described and illustrated in order to explain the nature of the invention, may be made by those skilled in the art within the principle and scope of the invention as expressed in the appended claims.

What is claimed is:
1. A method for visually detecting the presence of free water in hydrocarbon fuels which comprises the following steps, viz—
    (a) intermixing said hydrocarbon fuel with sodium fluorescein;
    (b) brominating the sodium fluorescein to produce sodium tetrabromo fluorescein;
    (c) pasing ammonia gas through the sodium tetrabromo fluorescein;
    (d) and observing the nature of the change in coloration of the ammoniated sodium tetrabromo fluorescein.
2. A method of determining the presence of free water in a hydrocarbon fuel which comprises the following steps, viz—
    (a) treating one side of an element with an alcohol solution saturated with the sodium salt of fluorescein, said element consisting of white circular unsized cellulosic material;
    (b) passing the fuel through the said element;
    (c) brominating the sodium salt of fluorescein on said element;
    (d) passing ammonia gas through the said element,
    (e) and observing the nature of the change in coloration of the ammoniated sodium tetrabromo fluorescein.
3. A method of determining the presence of free water in a hydrocarbon fuel which comprises the following steps, viz—
    (a) spraying an alcohol solution saturated with the sodium salt of fluorescein uniformly over one side of a white unsized filtering paper to a depth of 0.007 inch;
    (b) passing a hydrocarbon fuel through the filter paper at a rate of 150 cc./minute;
    (c) brominating the sodium salt of fluorescein on filter paper;
    (d) passing ammonia gas through the filter paper;
    (e) and observing the nature of the change in coloration of the ammoniated sodium tetrabromo fluorescein.
4. A method of determining the amount of free water in a hydrocarbon fuel which comprises the following steps, viz—
    (a) spraying an alcohol solution saturated with the sodium salt of fluorescein uniformly over one side of a white unsized filtering paper to a depth of 0.007 inch;
    (b) passing a hydrocarbon fuel through the filter paper at a rate of 150 cc./minute;
    (c) brominating the sodium salt of fluorescein on filter paper;
    (d) passing ammonia gas through the filter paper whereby the side of the paper containing the sodium fluorescein turns pink in the absence of water;
    (e) and comparing the color of the filter paper with predetermined standards.

References Cited
UNITED STATES PATENTS 3,066,221  11/1962  Thyrum _____ 250—71

OTHER REFERENCES

Laitinen, "Chemical Analysis," pages 212–213, McGraw-Hill, New York, 1960.

MORRIS O. WOLK, *Primary Examiner.*

L. MEI, *Assistant Examiner.*